(12) United States Patent
Teboulle

(10) Patent No.: US 12,163,817 B2
(45) Date of Patent: Dec. 10, 2024

(54) ULTRASONIC MEASUREMENT METHOD TAKING ACCOUNT OF THE QUANTITY OF GAS BUBBLES

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 322 days.

(21) Appl. No.: 17/237,927

(22) Filed: Apr. 22, 2021

(65) Prior Publication Data

US 2021/0333137 A1 Oct. 28, 2021

(30) Foreign Application Priority Data

Apr. 22, 2020 (FR) ...................... 20 04030

(51) Int. Cl.
*G01F 1/66* (2022.01)
*G01F 25/10* (2022.01)

(52) U.S. Cl.
CPC ................ *G01F 1/66* (2013.01); *G01F 25/10* (2022.01)

(58) Field of Classification Search
CPC ............ G01F 1/66; G01F 1/668; G01F 25/10; G01N 29/032; G01N 2291/015;
(Continued)

(56) References Cited

U.S. PATENT DOCUMENTS 4,183,244 A * 1/1980 Kohno .................. G01S 15/582
73/861.26
4,763,525 A 8/1988 Cobb
(Continued)

FOREIGN PATENT DOCUMENTS

EP 2636999 A1 9/2013
EP 2717026 A2 4/2014
(Continued)

OTHER PUBLICATIONS

Li et al. "Research on Transit-time Ultrasonic Flowmeter with Signal Characteristic Analysis," 2019 6th International Conference on Information Science and Control Engineering pp. 1131-1135 (Year: 2019).*

*Primary Examiner* — John Fitzgerald
(74) *Attorney, Agent, or Firm* — MUNCY, GEISSLER, OLDS & LOWE, P.C.

(57) ABSTRACT

A method of measuring the speed of a fluid includes: a measurement stage comprising the steps of emitting a measurement ultrasonic signal, of acquiring a main ultrasonic signal resulting from the measurement ultrasonic signal, and of analyzing the main ultrasonic signal in order to produce a present measurement of the travel time; a validation stage for validating the present measurement, the validation stage comprising the steps of acquiring a secondary ultrasonic signal also resulting from the measurement ultrasonic signal but delayed because of the presence of gas bubbles in the fluid, of evaluating one or more first parameters in the secondary ultrasonic signal that are representative of the quantity of gas bubbles in the fluid, and of validating or invalidating the present measurement as a function of the first parameter(s).

10 Claims, 2 Drawing Sheets

(58) Field of Classification Search
CPC ... G01N 2291/02433; G01N 2291/048; G01N 2291/102
See application file for complete search history.

(56) References Cited

U.S. PATENT DOCUMENTS

| | | | | |
|---|---|---|---|---|
| 5,473,934 A * | 12/1995 | Cobb | .................. | G01N 29/024 |
| | | | | 73/61.49 |
| 6,226,598 B1 * | 5/2001 | De Vanssay | ............ | G01F 1/667 |
| | | | | 702/45 |
| 6,546,810 B1 * | 4/2003 | Beauducel | ............. | G01F 1/667 |
| | | | | 73/861.27 |
| 6,647,805 B2 * | 11/2003 | Kobayashi | ................ | G01F 1/74 |
| | | | | 73/861.27 |
| 7,289,914 B2 * | 10/2007 | Hishida | ................... | G01F 1/712 |
| | | | | 73/861.27 |
| 10,088,590 B2 * | 10/2018 | Sinha | ........................ | G01F 1/74 |
| 10,627,272 B2 * | 4/2020 | Gysling | ................. | G01F 1/663 |
| 10,982,990 B2 * | 4/2021 | Teboulle | ................. | G01F 1/667 |
| 11,199,429 B2 * | 12/2021 | Teboulle | ................. | G01F 1/668 |
| 11,346,694 B2 * | 5/2022 | Teboulle | .............. | G01N 29/024 |
| 11,644,477 B2 * | 5/2023 | Teboulle | ................... | G01P 5/00 |
| | | | | 73/861.18 |
| 11,725,967 B2 * | 8/2023 | Dabak | .................... | G01N 29/36 |
| | | | | 73/861.28 |
| 2005/0011279 A1 * | 1/2005 | Takeda | .................... | G01F 1/663 |
| | | | | 73/861.26 |
| 2012/0055239 A1 * | 3/2012 | Sinha | ...................... | G01F 25/10 |
| | | | | 73/61.79 |
| 2013/0345996 A1 | 12/2013 | Satoh et al. | | |
| 2014/0096599 A1 * | 4/2014 | Munch | ................ | G01N 29/032 |
| | | | | 73/61.79 |

FOREIGN PATENT DOCUMENTS

| | | | | |
|---|---|---|---|---|
| JP | | 2004226391 A | * | 8/2004 |
| JP | WO2005083372 A1 | | * | 9/2005 |
| JP | | 5372831 B2 | * | 12/2013 |

* cited by examiner

ULTRASONIC MEASUREMENT METHOD TAKING ACCOUNT OF THE QUANTITY OF GAS BUBBLES

The invention relates to the field of ultrasonic measuring devices, e.g. as incorporated in fluid meters.

BACKGROUND OF THE INVENTION

Modern water meters are "smart" meters that not only measure the water consumption of a subscriber's installation, but that also perform novel functions: leak detection, billing optimization, remote reading, etc.

Whereas traditional water meters conventionally make use of a mechanical measuring device, modern water meters generally make use of an ultrasonic measuring device.

An ultrasonic measuring device includes a pipe along which the water being supplied to the installation flows at a certain rate. In order to evaluate the flow rate of the water, the ultrasonic measuring device emits an ultrasonic measurement signal into the pipe to travel along a path of defined length, it measures the travel times taken by the ultrasonic measurement signal to travel along the path of defined length both from upstream to downstream and from downstream to upstream, and it estimates the speed of the water on the basis in particular of the defined length and of the difference between the travel times.

Such an ultrasonic measuring device presents a number of advantages compared with a mechanical measuring device. In particular, an ultrasonic measuring device is hermetically sealed and does not have any moving parts, so it does not suffer from leaks or from mechanical wear: its accuracy does not degrade over time (or degrades very little).

Nevertheless, an ultrasonic measuring device is sensitive to the presence of bubbles of air in the water, which bubbles may be generated by the occurrence of a vortex, i.e. of turbulence occurring in the flow of water. The speed of sound in air (about 340 meters per second (m/s)) is much lower than the speed of sound in water (about 1500 m/s), such that the presence of bubbles of air can disturb travel time measurements significantly.

OBJECT OF THE INVENTION

An object of the invention is to improve the accuracy of an ultrasonic measuring device.

SUMMARY OF THE INVENTION

In order to achieve this object, there is provided a measurement method for measuring a fluid speed, the method comprising:
- a measurement stage comprising the steps of emitting a measurement ultrasonic signal and of acquiring a main ultrasonic signal resulting from the measurement ultrasonic signal after the measurement ultrasonic signal has travelled along a path of defined length through the fluid, the main ultrasonic signal being for analyzing in order to produce a present measurement of the travel time of the measurement ultrasonic signal;
- a validation stage for validating the present measurement, the validation stage comprising the steps of acquiring a secondary ultrasonic signal also resulting from the measurement ultrasonic signal but delayed because of the presence of gas bubbles in the fluid, of evaluating one or more first parameters in the secondary ultrasonic signal that are representative of the quantity of gas bubbles in the fluid, and of validating or invalidating the present measurement as a function of the first parameter(s).

The measurement method of the invention thus analyzes the secondary ultrasonic signal in order to evaluate the quantity of gas bubbles in the fluid and thus determine whether the gas bubbles have or have not disturbed the main ultrasonic signal in significant manner.

The measurement method is particularly astute: the main ultrasonic signal that is used to produce the present measurement of the travel time might potentially be subjected to distortion, but this distortion is evaluated not on the basis of analyzing the main ultrasonic signal itself, but rather on the basis of analyzing the secondary ultrasonic signal. The secondary ultrasonic signal is delayed because of the presence of gas bubbles giving rise to a multi-path phenomenon in the fluid.

If the quantity of gas bubbles in the fluid is too great, the present measurement is invalidated. Measurement accuracy is thus improved by eliminating measurements in which accuracy is degraded by gas bubbles.

There is also provided a measurement method as described above, wherein the first parameter(s) comprise(s) the number of lobes of the secondary ultrasonic signal that are greater than or equal to a predefined amplitude threshold, and wherein the present measurement is invalidated when the number of lobes of the secondary ultrasonic signal that are greater or equal to the predefined amplitude threshold is greater than a predefined number.

There is also provided a measurement method as described above, wherein the validation stage also comprises a step of evaluating one or more second parameters in the secondary ultrasonic signal that are representative of the quantity of gas bubbles in the fluid, and if the present measurement is invalidated, a step of replacing the present measurement by a preceding measurement, taken before the present measurement, and corrected as a function of the second parameter(s).

There is also provided a measurement method as described above, wherein the second parameters comprise both a particular time that is representative of the delay of the secondary ultrasonic signal and also the maximum amplitude of the secondary ultrasonic signal.

There is also provided a measurement method as described above, wherein the correction of the preceding measurement consists in multiplying said preceding measurement by a correction coefficient defined by the following formula:

$$M = \min\left(\left(1 - \frac{t_2 - t_1}{(t_{max} - t_p) - t_1}\right); \left(1 - \frac{U' - U}{U_{max} - U}\right)\right),$$

where:
- M is the correction coefficient;
- $t_2$ is the particular time representative of the delay of the secondary ultrasonic signal;
- $t_1$ is the start of a listening time for listening for the secondary ultrasonic signal;
- $t_{max}$ is the duration between the start of a listening time $t_0$ for listening for the main ultrasonic signal and the end of the listening time for listening for the secondary ultrasonic signal;
- U is the predefined amplitude threshold;
- U' is the maximum amplitude of the secondary ultrasonic signal;

$U_{max}$ is a maximum level not to be exceeded by any lobe of the secondary ultrasonic signal;

$t_p$ is a predefined time value.

There is also provided an ultrasonic measuring device comprising an upstream transducer, a downstream transducer, and a processor component that performs the above-described measurement method.

There is also provided a fluid meter including an ultrasonic measuring device as described above.

There is also provided a medical device including an ultrasonic measuring device as described above.

There is also provided a computer program including instructions for causing the above-described ultrasonic measuring device to execute the steps of the above-described measurement method.

There is also provided a computer readable storage medium, having stored thereon the above-described computer program.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

In this example, the invention is performed in a water meter that is used to measure the water consumption of a subscriber's installation. The water is supplied to the installation by a water distribution network.

The water meter comprises firstly a communication module that enables the water meter to communicate with an information system (IS) of the network manager, possibly via a data concentrator, a gateway, or indeed another meter (such as a district smart meter). The communication module may perform any type of communication, and for example communication via a cellular network of 2G, 3G, 4G, Cat-M, or NB-IoT type, communication using the long range (LoRa) protocol, radio communication using the Wize standard operating at the frequency of 169 megahertz (MHz), etc. At regular intervals, the water meter uses the communication module to transmit to the IS the measurements that have been taken.

The water meter also comprises both a pipe conveying the flow of water being supplied by the water distribution network to the subscriber's installation, and also an ultrasonic measuring device.

Figure 1:
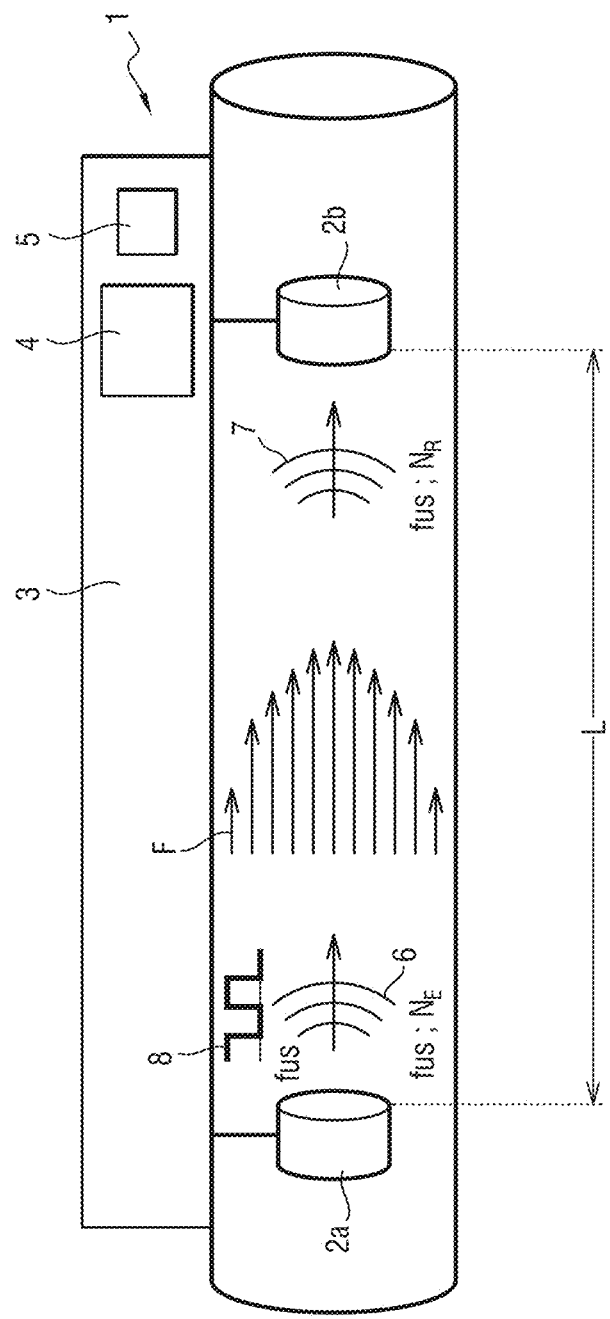
FIG. 1 shows an ultrasonic measuring device of a water meter in which the invention is performed.

The ultrasonic measuring device 1 is visible in FIG. 1.

Water flows in the pipe from upstream to downstream, as indicated by the direction of arrows F.

The ultrasonic measuring device 1 includes an upstream transducer 2a and a downstream transducer 2b. The ultrasonic measuring device 1 also includes a measurement module 3 connected to the upstream transducer 2a and to the downstream transducer 2b.

The upstream transducer 2a and the downstream transducer 2b are paired. In this example, the upstream transducer 2a and the downstream transducer 2b are piezoelectric transducers.

The measurement module 3 includes a processor component 4 that is adapted to execute instructions of a program in order to perform some or all of the steps of the measurement method as described below. By way of example, the processor component 4 is a microcontroller, a processor, or indeed a programmable logic circuit such as a field programmable gate array (FPGA) or an application specific integrated circuit (ASIC).

The measurement module 3 also includes an analog to digital converter (ADC) 5 (possibly incorporated in the processor component 4).

The measurement module 3 controls the upstream transducer 2a and the downstream transducer 2b.

The upstream transducer 2a and the downstream transducer 2b each performs in succession the function of an emitter of ultrasonic measurement signals 6 and the function of a receiver of ultrasonic measurement signals 7 that result from the propagation of the ultrasonic measurement signals 6 as emitted by the emitter.

The measurement module 3 generates an electrical excitation signal 8 and delivers the electrical excitation signal 8 to the emitter.

The emitter transforms the electrical excitation signal 8 into an ultrasonic measurement signal 6. The measurement module 3 acquires the received ultrasonic measurement signal 7, which is received by the receiver.

In this example, the electrical excitation signal 8 is a square wave signal of frequency $f_{us}$ and of period $T_{us}$. The frequency $f_{us}$ conventionally lies in the range 900 kilohertz (kHz) to 4 MHz, and in this example it is equal to 1 MHz.

Between the upstream transducer 2a and the downstream transducer 2b, the ultrasonic measurement signal 6 thus travels along a path of defined length L from upstream to downstream (and then from downstream to upstream for the measurement where it is the transducer 2b that emits). In this example, the path of defined length is a rectilinear path between the upstream transducer 2a and the downstream transducer 2b. The defined length L is typically equal to the 7 centimeters (cm).

In FIG. 1, the upstream transducer 2a is shown as performing the function of an emitter, and the downstream transducer 2b is shown as performing the function of a receiver. The electrical excitation signal 8 is thus applied as input to the upstream transducer 2a in order to emit the ultrasound measurement signal 6. The ultrasonic measurement signal 6 thus follows the path of defined length L from upstream to downstream. The ultrasound measurement signal 6 is emitted by the emitter at a level $N_E$. The ultrasonic measurement signal 7 is received by the receiver at a level $N_R$ lower than the level $N_E$.

The measurement module 3 acquires the ultrasonic measurement signal 7 after it has travelled through the water along the path of defined length. The measurement module 3 digitizes the ultrasonic measurement signal 7 by using the ADC 5, and it produces measurement samples. For a signal of frequency $f_{us}$=1 MHz, the sampling frequency is typically 4 MHz in order to comply with the Shannon criterion.

The measurement module 3 measures the travel time taken by the ultrasound measurement signal 6 to travel along the path of defined length from upstream to downstream.

In reality, the measurement module 3 measures a global transfer time $T_{AB}$ from the upstream transducer 2a to the downstream transducer 2b.

The global transfer time $T_{AB}$ is such that:

$$T_{AB}=TA_A+ToF_{AB}+TR_B, \text{ where:}$$

$TA_A$ is a switch-on time of the upstream transducer 2a;
$ToF_{AB}$ corresponds to the time of flight taken by the emitted ultrasonic measurement signal 6 to travel along the path of defined length between the upstream transducer 2a and the downstream transducer 2b;
$TR_B$ is a reception time of the downstream transducer 2b.

Likewise, the downstream transducer 2b emits an ultrasonic measurement signal that is received by the upstream transducer 2a.

The measurement module 3 measures the global transfer time $T_{BA}$, which is such that:

$$T_{BA}=TA_B+ToF_{BA}+TR_A, \text{ where:}$$

$T_{AB}$ is a switch-on time of the downstream transducer 2b;
$ToF_{BA}$ corresponds to the time of flight taken by the ultrasonic measurement signal to travel along the path of defined length between the downstream transducer 2b and the upstream transducer 2a;
$TR_A$ is a reception time of the upstream transducer 2b.
Assuming that:
$TAA=TA_B$ and $TRA=TR_B$ (paired transducers), then the following is obtained:

$$\Delta T=TBA-TAB=ToF_{BA}-ToF_AB=DToF$$

where DToF is the differential time-of-flight.

However, the DToF is proportional to the mean speed of the water, so the measurement module 3 can then calculate the mean speed of the water by using the DToF. The mean speed is signed and it may be positive, negative, or zero.

The measurement module 3 then deduces the mean speed of the flow of water in the pipe, and from this water flow rate it calculates the volume of water consumed by the installation.

Nevertheless, when the ultrasonic measurement signal is propagating in water, it can be disturbed by the presence of bubbles of air in the water.

As a result of these bubbles of air, the receiver no longer receives a single signal associated with an ultrasonic measurement signal 6 that has just been emitted, but rather it receives a plurality of signals comprising a main ultrasonic signal plus one or more secondary ultrasonic signals that arrive after a certain delay compared with the main ultrasonic signal.

Each secondary ultrasonic signal corresponds to a portion of the ultrasonic measurement signal that has passed through bubbles of air before reaching the receiver. The secondary ultrasonic signal(s) thus result from a multi-path phenomenon: while a main portion of the ultrasonic measurement signal propagates directly through water in order to reach the transducer performing the receiver function, thereby forming the main ultrasonic signal, one or more secondary portions of the ultrasonic measurement signal propagate via bubbles of air, and thus reach the receiver after a certain delay (in the manner of an echo).

On the basis of the main ultrasonic signal alone, the processor component 4 cannot detect whether that signal has or has not been disturbed in considerable manner.

However, the travel time must be measured extremely accurately (to within picosecond (ps) order), and the slightest distortion of the signal can be fatal.

The measurement method of the invention thus consists in acquiring at least one secondary ultrasonic signal, in analyzing the secondary ultrasonic signal, and on the basis of that analysis, in determining whether the main ultrasonic signal is or is not suitable for measurement purposes.

The measurement method of the invention thus comprises both measurement stages and validation stages.

During each measurement stage, the ultrasonic measuring device 1 acquires a main ultrasonic signal suitable for providing a present travel time measurement.

The measurement stages are repeated regularly. In this example, 8 upstream-to-downstream travel time measurements and 8 downstream-to-upstream travel time measurements are taken per second.

For each measurement stage, the measurement method of the invention also includes a validation stage, during which the ultrasonic measuring device 1 acquires a secondary ultrasonic signal that, on being analyzed, enables the present travel time measurement taken during said measurement stage to be validated or invalidated.

The validation stages serve to improve the accuracy of the measurements by filtering out measurements that are taken while bubbles of air are present in excess (i.e. by not taking account of said measurements).

Figure 2:
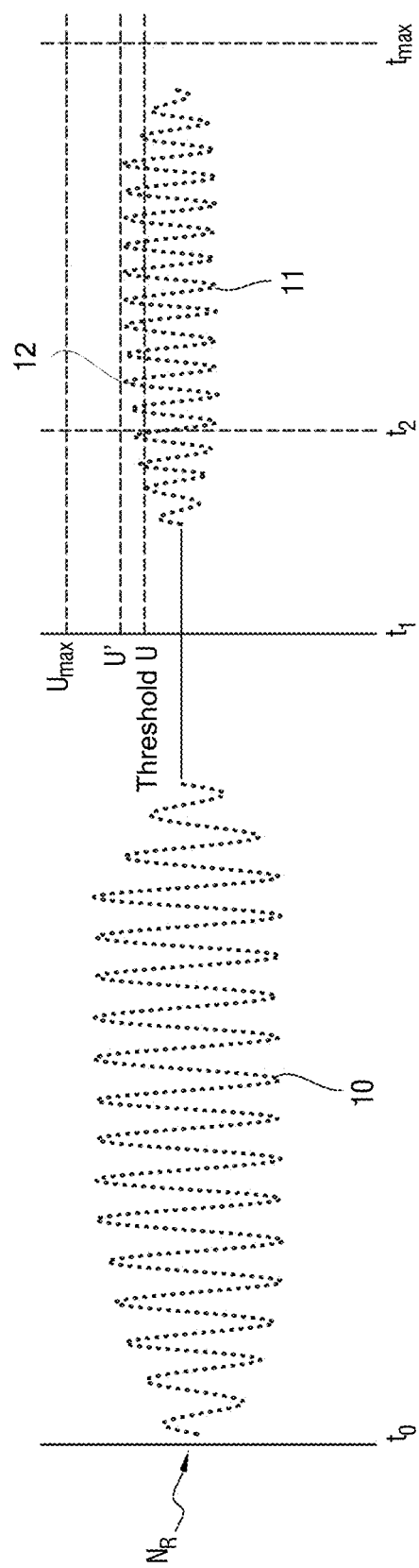
FIG. 2 shows a main ultrasonic signal and a secondary ultrasonic signal.

Each measurement stage is performed as follows. The processor component 4 of the measurement module 3 emits an ultrasonic measurement signal via that one of the transducers 2 (upstream transducer 2a or downstream transducer 2b) that is acting as an emitter. Thereafter, and with reference to FIG. 2, the processor component 4 acquires a main ultrasonic signal 10 resulting from the measurement ultrasonic signal after the measurement ultrasonic signal has travelled through the fluid along the path of defined length, this signal being acquired via the other one of the transducers 2 (downstream transducer 2b or upstream transducer 2a) that is then acting as a receiver.

In order to acquire the main ultrasonic signal 10, the ultrasonic measuring device 1 starts a main listening window at the start of a listening time $t_0$ for listening for the main ultrasonic signal 10. In this example, the main listening window has a duration equal to 25 microseconds (µs).

The main ultrasonic signal 10 is sampled by the ADC 5 of the measurement module 3 and is then analyzed by the processor component 4 of the measurement module 3 in order to produce a present travel time measurement for the measurement ultrasonic signal.

By way of example, the analysis may consist in determining the moment at which a predetermined lobe (i.e., peak) of the main ultrasonic signal 10 arrives. In this example, the moment of arrival is the instant at which a falling edge of the predetermined lobe arrives. The moment of arrival may be measured by a zero crossing type method.

By way of example, the predetermined lobe is an $i^{th}$ lobe (i.e. the fourth or the fifth lobe, for example) of the main ultrasonic signal 10 after the amplitude of the main ultrasonic signal 10 has exceeded a predetermined level.

Thereafter, the ultrasonic measurement device 1 performs a validation stage, associated with the measurement stage as described above, in order to determine whether the main ultrasonic signal 10 is or is not suitable for measurement purposes.

The validation stage consists initially in attempting to acquire a secondary ultrasonic signal 11 likewise resulting from the measurement ultrasonic signal, but delayed because of the presence of bubbles of air in the water.

In order to acquire the secondary ultrasonic signal 11, the ultrasonic measuring device 1 starts a secondary listening window at the start of a listening time $t_1$ for listening for the secondary ultrasonic signal 11. The start of the listening time $t_1$ is such that:

$$t_1 = t_0 + t_{ec}.$$

In this example, $t_{ec}$=80 μs.

The ultrasonic measuring device 1 listens until time $t_0+t_{max}$, $t_{max}$ thus being the duration between the start of the listening time $t_0$ for listening for the main ultrasonic signal 10 and the end of the listening time for listening for the secondary ultrasonic signal 11.

In this example, $t_{max}$=200 μs.

The processor component 4 then evaluates one or more first parameters in the secondary ultrasonic signal 11 that are representative of the quantity of bubbles of air in the water, and it validates or invalidates the present travel time measurement as a function of the first parameter(s).

In this example, the first parameter(s) comprise(s) the number of lobes 12 of the secondary ultrasonic signal 11 that are greater than or equal to a predefined amplitude threshold U.

The present measurement is invalidated when the number of lobes 12 in the secondary ultrasonic signal 11 that are greater than or equal to the predefined amplitude threshold U is greater than a predefined number.

In this example, the predefined number is equal to 5.

Thus, if the processor component 4 detects more than 5 lobes≥U, then the processor component 4 considers there are sufficient bubbles of air in the water to disturb the present measurement significantly. The present measurement is thus invalidated and it is not used for estimating the water flow rate and thus the volume of water consumed by the installation.

The validation stage also comprises a step of evaluating one or more second parameters in the secondary ultrasonic signal 11 that are representative of the quantity of bubbles of air in the water, and if the present measurement is invalidated, it also comprises a step of replacing the present measurement with a corrected preceding measurement, the preceding measurement being taken over the same period of one second, but before the present measurement, and being corrected as a function of the second parameter(s).

In this example, the second parameters comprise both a particular time that is representative of the delay of the secondary ultrasonic signal 11, and also the maximum amplitude of the secondary ultrasonic signal 11.

Specifically, the delay of the secondary ultrasonic signal 11 (to the right of $t_1$) and its maximum amplitude give an idea about the quantity of bubbles of air that have disturbed the present measurement.

In this example, the particular time $t_2$ is the zero crossing instant in the downward direction of the first lobe of the secondary ultrasonic signal 11 that exceeds the predefined amplitude threshold U (evaluated using the zero crossing method).

The corrected version of the preceding measurement, which replaces the present measurement, consists in multiplying the preceding measurement by a correction coefficient defined by the following formula:

$$M = \min\left(\left(1 - \frac{t_2 - t_1}{(t_{max} - t_p) - t_1}\right); \left(1 - \frac{U' - U}{U_{max} - U}\right)\right),$$

where:

M is the correction coefficient;

$t_2$ is the particular time representative of the delay of the secondary ultrasonic signal 11;

$t_1$ is the start of a listening time for listening for the secondary ultrasonic signal 11;

$t_{max}$ is the duration between the start of a listening time $t_0$ for listening for the main ultrasonic signal 10 and the end of the listening time for listening for the secondary ultrasonic signal 11;

U is the predefined amplitude threshold;

U' is the maximum amplitude of the secondary ultrasonic signal 11;

$U_{max}$ is a maximum level not to be exceeded by any lobe of the secondary ultrasonic signal 11;

$t_p$ is a predefined time value.

Thus instead of using the present measurement, use is made of a percentage of the preceding measurement.

The greater the delay and/or the higher the maximum amplitude of the secondary ultrasonic signal 11, the greater the quantity of air bubbles, and thus the greater the amount by which the preceding measurement is reduced.

The predefined time value $t_p$ serves to take account of the fact that at least 5 lobes of the secondary ultrasonic signal 11 have reached or exceeded the predefined amplitude threshold U.

It can thus be seen that in the event of a large amount of bubbles of air being present, the present measurement is not taken into account. Nevertheless, if the 8 measurements taken over one second are not taken into account, the mean value is replaced by the mean value measured over the following second. In the event of the 8 measurements not being taken into account over 3 consecutive seconds, the measurements are taken to be zero.

Naturally, the invention is not limited to the embodiment described, but covers any variant coming within the ambit of the invention as defined by the claims.

As mentioned above, if the quantity of bubbles of air is too great, the present travel time measurement is invalidated. As described above, the present measurement is invalidated after the travel time has been evaluated, but it could also be invalidated beforehand: it is entirely possible to analyze the secondary ultrasonic signal before analyzing the main ultrasonic signal, and thus to invalidate the present measurement (on the basis of the analysis of the secondary ultrasonic signal) without even evaluating the travel time on the basis of the main ultrasonic signal.

Although not described above, the first parameter(s) could be identical to the second parameter(s).

The meter incorporating the ultrasonic measuring device in which the invention is performed need not necessarily be a water meter, but it could be a meter for any fluid that might contain gas bubbles. By way of example, the fluid in question might be a liquid other than water, or indeed oil.

The ultrasonic measuring device need not necessarily be incorporated in a meter, but it could be incorporated into some other type of device, e.g. in a medical device that is used to measure a blood flow rate.

The invention claimed is:

1. A measurement method for measuring the speed of a fluid, the measurement method being performed by a processor component of an ultrasonic measuring device, said ultrasonic measuring device further comprising an upstream transducer and a downstream transducer provided in a fluid path with a defined length therebetween, the upstream transducer and the downstream transducer each functioning as an emitter and a receiver and alternately emitting a measurement signal when functioning as the emitter, wherein when the upstream transducer functions as the emitter, the downstream transducer functions as the receiver, and when the downstream transducer functions as the emitter, the upstream transducer functions as the receiver, the method being performed for each emission of the measurement ultrasonic signal and comprising:

emitting by the emitter the measurement ultrasonic signal to the receiver along the fluid path;

acquiring by the receiver a main ultrasonic signal of the measurement ultrasonic signal;

analyzing in order to produce a present measurement of the travel time of the measurement ultrasonic signal, and calculating the speed of the fluid using travel time of main ultrasonic signal of the measurement ultrasonic signal;

acquiring by the receiver a secondary ultrasonic signal of the measurement ultrasonic signal, the secondary ultrasonic signal being produced from the measurement ultrasonic signal passing through gas bubbles in the fluid and being received by the receiver with a delay as a result of a reduced emission speed of the measurement ultrasonic signal due to the gas bubbles; and evaluating one or more first parameters in the secondary ultrasonic signal that are representative of a quantity of the gas bubbles in the fluid, and invalidating the present measurement as a function of the one or more first parameters.

2. A non-transitory computer readable storage medium having stored thereon the computer program including instructions that cause the processor component of an ultrasonic measuring device to execute the measurement method of claim 1.

3. The measurement method according to claim 1, wherein the one or more first parameters comprise a number of lobes of the secondary ultrasonic signal that are greater than or equal to a predefined amplitude threshold, and wherein the present measurement is invalidated when the number of lobes of the secondary ultrasonic signal that are greater or equal to the predefined amplitude threshold is greater than a predefined number.

4. The measurement method according to claim 3, wherein the correction of the preceding measurement consists in multiplying said preceding measurement by a correction coefficient defined by the following formula:

$$M = \min\left(\left(1 - \frac{t_2 - t_1}{(t_{max} - t_p) - t_1}\right); \left(1 - \frac{U' - U}{U_{max} - U}\right)\right),$$

M is the correction coefficient;

$t_2$ is the particular time representative of the delay of the secondary ultrasonic signal;

$t_1$ is the start of a listening time for listening for the secondary ultrasonic signal;

$t_{max}$ is the duration between the start of a listening time to for listening for the main ultrasonic signal and the end of the listening time for listening for the secondary ultrasonic signal;

U is the predefined amplitude threshold;

U' is the maximum amplitude of the secondary ultrasonic signal;

$U_{max}$ is a maximum level not to be exceeded by any lobe of the secondary ultrasonic signal;

$t_p$ is a predefined time value.

5. The measurement method according to claim 1, wherein the validation stage also comprises a step of evaluating one or more second parameters in the secondary ultrasonic signal that are representative of the quantity of gas bubbles in the fluid, and if the present measurement is invalidated, a step of replacing the present measurement by a preceding measurement, taken before the present measurement, and corrected as a function of the one or more second parameter.

6. The measurement method according to claim 5, wherein the one or more second parameters comprise both a particular time that is representative of the delay of the secondary ultrasonic signal and also the maximum amplitude of the secondary ultrasonic signal.

7. The measurement method according to claim 5, wherein the correction of the preceding measurement consists in multiplying said preceding measurement by a correction coefficient defined by the following formula:

$$M = \min\left(\left(1 - \frac{t_2 - t_1}{(t_{max} - t_p) - t_1}\right); \left(1 - \frac{U' - U}{U_{max} - U}\right)\right),$$

M is the correction coefficient;

$t_2$ is the particular time representative of the delay of the secondary ultrasonic signal;

$t_1$ is the start of a listening time for listening for the secondary ultrasonic signal;

$t_{max}$ is the duration between the start of a listening time to for listening for the main ultrasonic signal and the end of the listening time for listening for the secondary ultrasonic signal;

U is the predefined amplitude threshold;

U' is the maximum amplitude of the secondary ultrasonic signal;

$U_{max}$ is a maximum level not to be exceeded by any lobe of the secondary ultrasonic signal;

$t_p$ is a predefined time value.

8. An ultrasonic measuring device comprising an the upstream transducer, a downstream transducer, and a the processor component that performs the measurement method according to claim 1.

9. A fluid meter including an ultrasonic measuring device according to claim 8.

10. A medical device including an ultrasonic measuring device according to claim 8.

* * * * *